(12) United States Patent
White

(10) Patent No.: US 7,347,402 B2
(45) Date of Patent: Mar. 25, 2008

(54) ARCHERY BOW SUPPORT MECHANISM

(76) Inventor: Adam White, P.O. Box 692, Prestonsburg, KY (US) 41653

( * ) Notice: Subject to any disclaimer, the term of this patent is extended or adjusted under 35 U.S.C. 154(b) by 0 days.

(21) Appl. No.: 11/228,160

(22) Filed: Sep. 16, 2005

(65) Prior Publication Data
US 2006/0086868 A1    Apr. 27, 2006

Related U.S. Application Data

(60) Provisional application No. 60/621,424, filed on Oct. 22, 2004.

(51) Int. Cl.
*F16M 11/06* (2006.01)
(52) U.S. Cl. ..................... 248/181.1; 124/86
(58) Field of Classification Search ............ 248/163.1, 248/176.1, 177.1, 181.1, 181.2, 188.5; 124/86; 42/94
See application file for complete search history.

(56) References Cited

U.S. PATENT DOCUMENTS

| | | |
|---|---|---|
| 1,295,688 A | 2/1919 | Butler |
| 3,445,082 A | 5/1969 | Proctor et al. |
| 5,194,678 A | 3/1993 | Kramer |
| 5,195,726 A * | 3/1993 | Kaner ........................ 254/325 |
| 5,267,712 A * | 12/1993 | Shen ....................... 248/179.1 |
| 5,351,867 A | 10/1994 | Vest |
| 5,487,374 A | 1/1996 | Herminath et al. |
| 5,509,400 A | 4/1996 | Chalin |
| 5,567,939 A * | 10/1996 | Hong ....................... 250/338.1 |
| 5,723,808 A | 3/1998 | Devall |
| 6,021,768 A | 2/2000 | Pomaville |
| 6,070,569 A | 6/2000 | Chalin et al. |
| 6,205,992 B1 | 3/2001 | Meeks et al. |
| 6,820,844 B2 * | 11/2004 | Tiffen et al. ................. 248/168 |
| 6,983,916 B2 * | 1/2006 | Raynaud .................. 248/163.2 |
| 2004/0155159 A1* | 8/2004 | Tiffen et al. ............. 248/177.1 |
| 2005/0151036 A1* | 7/2005 | Speggiorin ............... 248/177.1 |
| 2006/0138289 A1* | 6/2006 | Speggiorin ............... 248/163.1 |
| 2006/0175483 A1* | 8/2006 | Osaka ...................... 248/177.1 |

* cited by examiner

*Primary Examiner*—Ramon O Ramirez
(74) *Attorney, Agent, or Firm*—Stockwell & Smedley, PSC

(57) ABSTRACT

A mounting mechanism for an archery bow is disclosed. The mechanism can assist an archer in focusing on a target or prey without having to bear the weight of the bow while doing so.

18 Claims, 9 Drawing Sheets

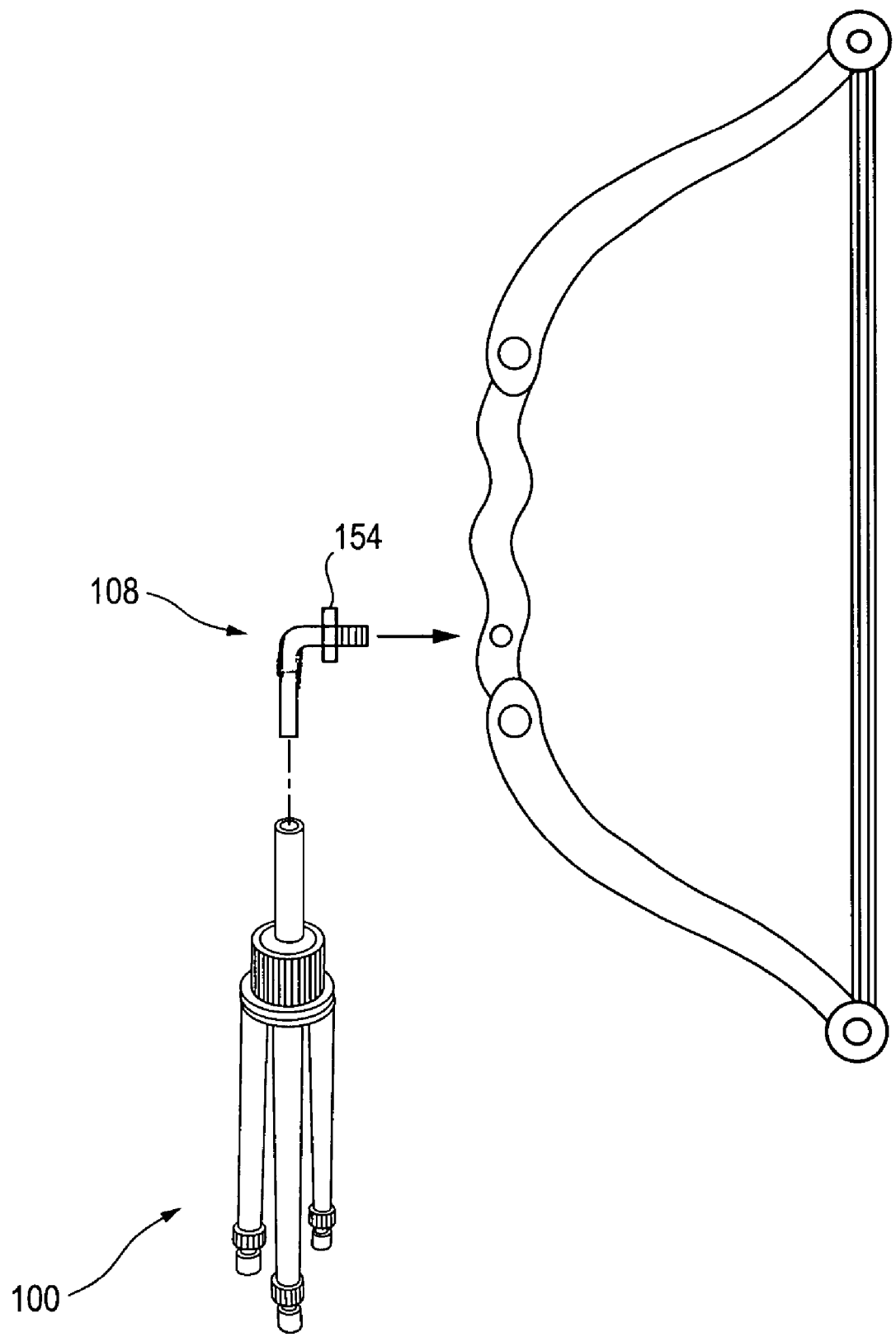

FIG. 4B
FIG. 4C
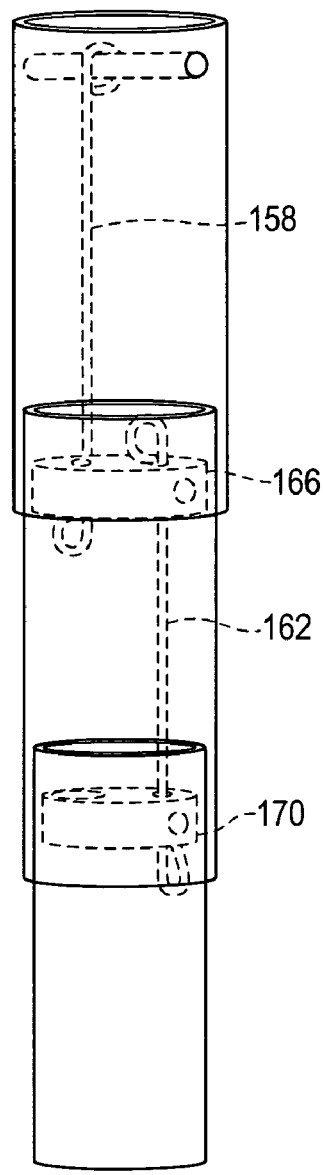
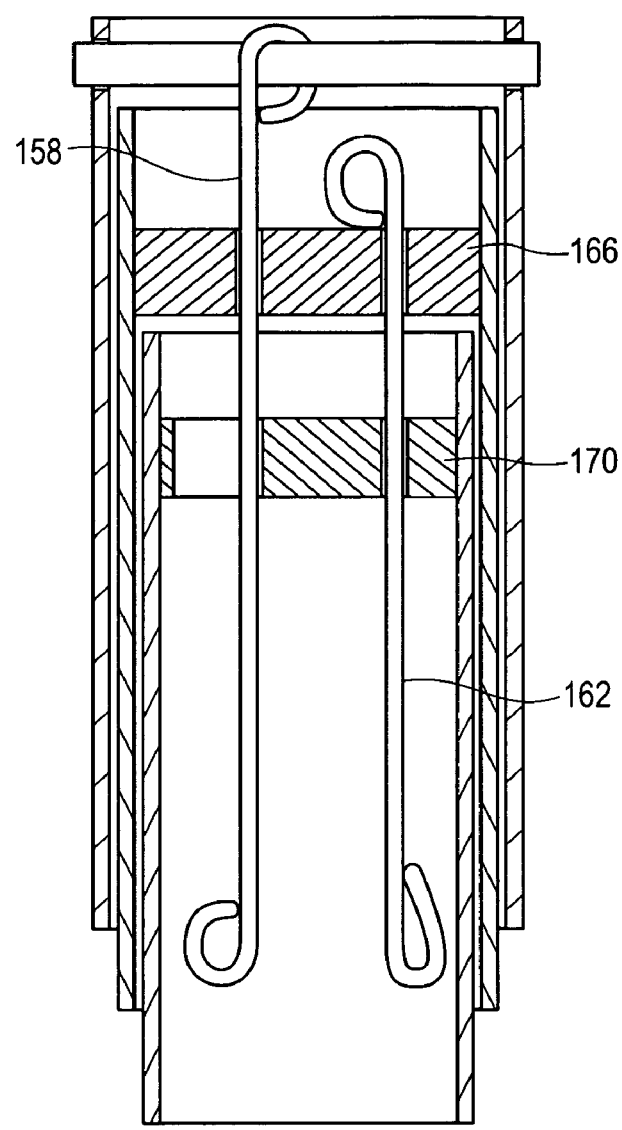

ARCHERY BOW SUPPORT MECHANISM

CROSS-REFERENCE TO RELATED APPLICATIONS

This application claims priority to U.S. Provisional Application No. 60/621,424, which was filed on Oct. 22, 2004.

FIELD OF THE INVENTION

This invention relates generally to bow hunting, and more specifically to a bow stand for assisting archers in making more accurate shots.

BACKGROUND OF THE INVENTION

Currently bow hunting for live prey can be made difficult by the fact that an archer's range of successful shots is limited by how steadily they hold the bow. The present invention provides a means for reducing the strain of holding the bow while sighting, and thereby allows the archer to concentrate more on effectively focusing on the target.

SUMMARY OF THE INVENTION

It is an object of the present invention to provide a means for reducing the strain of holding an archery bow while sighting, and thereby allow the archer to concentrate more on effectively focusing on a target. It is another object of the present invention to achieve the above by use of a stand, which has a ball and socket mechanism mounted therein. These and other objects and advantages of the invention will become readily apparent as the following description is read in conjunction with the accompanying drawings.

BRIEF DESCRIPTION OF THE DRAWINGS

FIGS. 4A-C show a detailed views of the rods within the tripod shown in FIG. 1.

DETAILED DESCRIPTION OF THE PREFERRED EMBODIMENTS

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

The present invention is directed toward a stand to be used during archery. It is well-known that an archer's arm suffers stress while shooting because of the tension of the bowstring, the precise aiming, and the weight of the bow. Such tension leads to fatigue and wavering of the arm, which lessens the archer's accuracy. To address this, the present invention provides a stand on which the bow can be rested, which removes the weight of the bow from resting entirely on the archer's arm. Further, the present invention also steadies the bow from downward movement from a wavering hand.

Figure 1A:
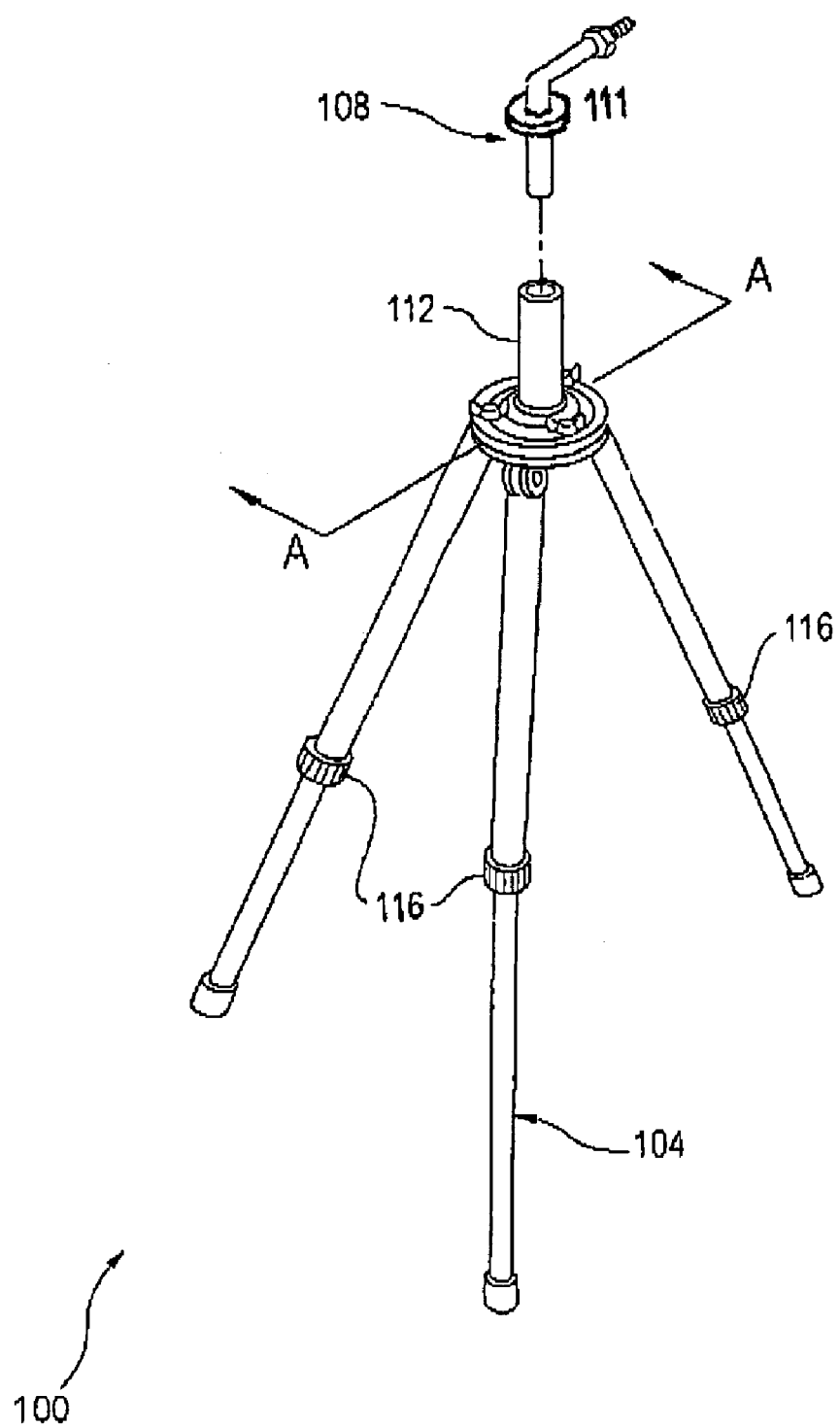
FIG. 1A is a perspective view of an exemplary embodiment of the present invention.

FIG. 1A shows a first embodiment of the present invention, in which the stand 100 comprises a tripod 104 and a bow mount 108. The bow mount 108 rests in a socket 112 in such a way that the mount 108 can be fixedly secured within the socket 112. The socket 112 can be but is not necessarily threaded, so that the present invention should not be considered as limited exclusively thereto. The stand 100 is height-adjustable via the threaded securing mechanisms 116.

Although not shown in FIG. 1A, means for securing the bow mount 108 on top of the socket 112 include but are not limited to threaded screws, cotter pins, or a clamping mechanism which can be manually adjusted, either using threaded or gnurled surfaces or using some other type of adjustment mechanism not specifically described herein. It is important that the bow mount 108 be removable from the socket 112 for disassembly and transportation purposes.

As shown in FIG. 1A, the tripod mechanism 104 is somewhat similar to that used for photography, in that a ball and socket 112 is employed, and also that threaded securing mechanisms 116 allow for quickly making adjustments to the height of the stand 100.

Figure 1B:
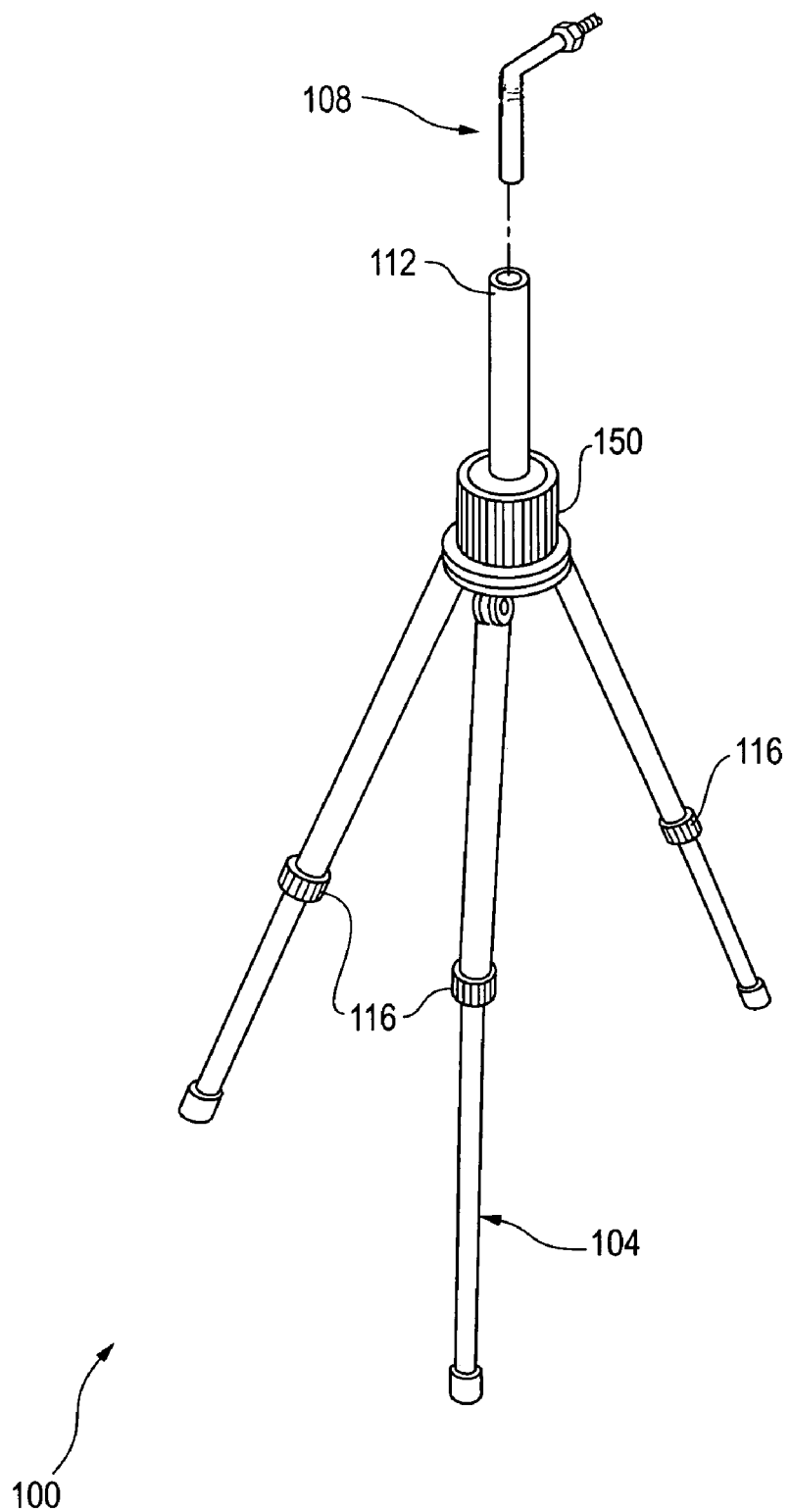
FIG. 1B is a perspective view of an exemplary embodiment of the present invention.
Figure 1C:
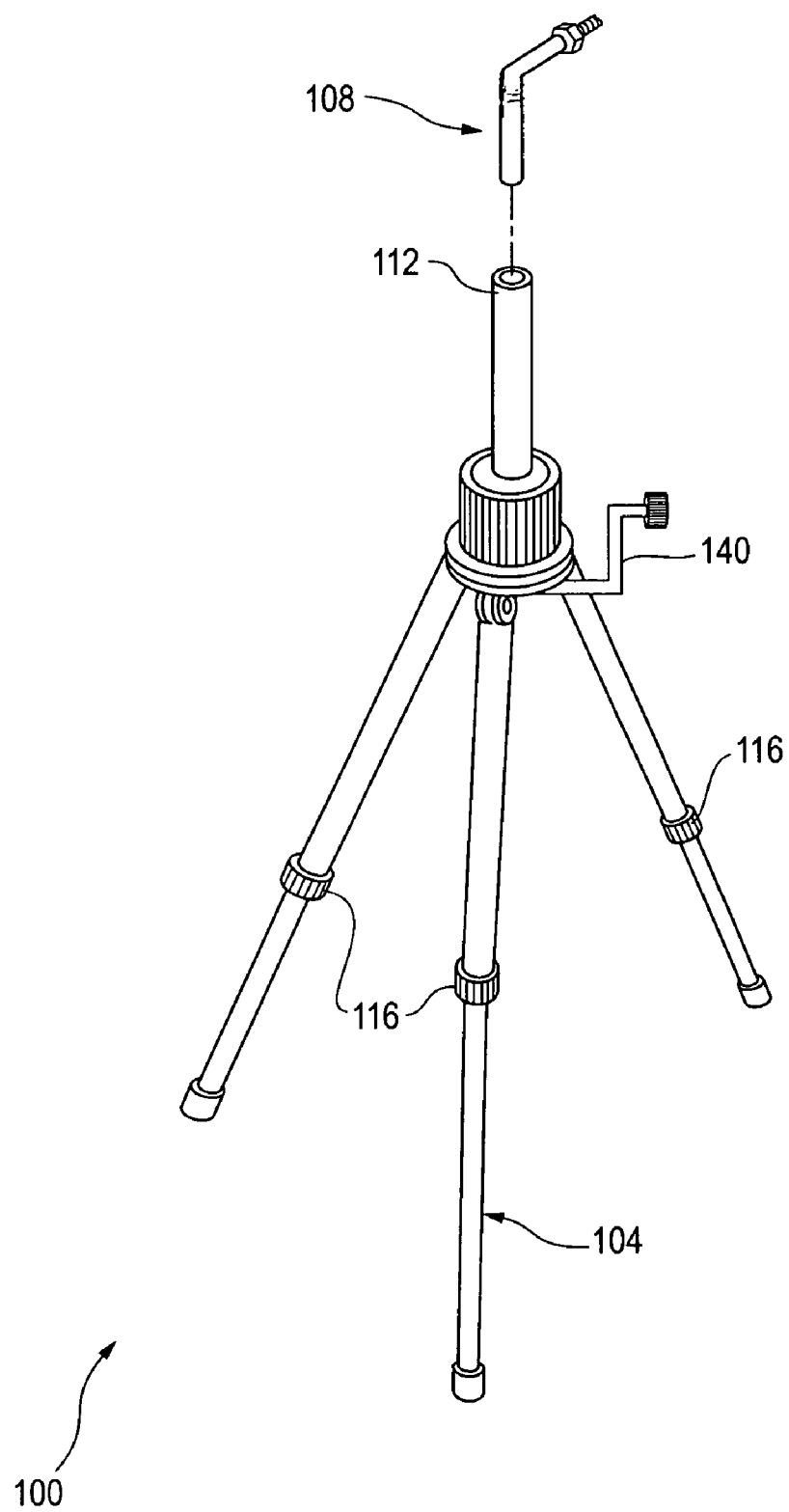
FIG. 1C is a perspective view of an exemplary embodiment of the present invention.

FIG. 1B shows a second embodiment of the present invention in which a gnurled securing mechanism 150 is employed. FIG. 1C shows the embodiment of FIG. 1B with an optional winch for adjusting the elevation of the ball and socket 112.

Figure 2A:
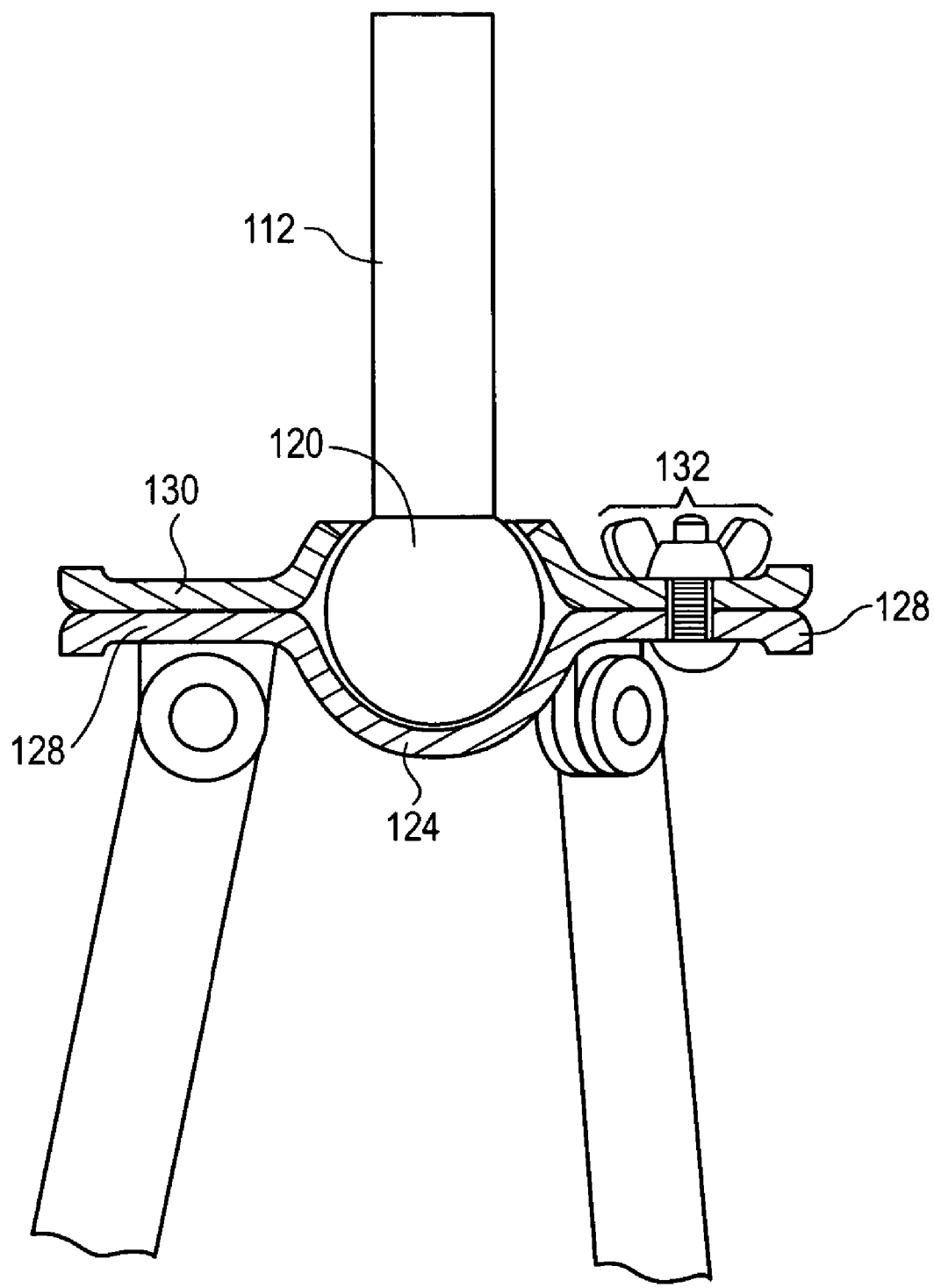
FIG. 2A is a more detailed view of ball swivel shown in FIG. 1.

FIG. 2A shows a cut-away sectioned view of the socket 112 as shown along the lines A-A in FIG. 1A. It is important to understand that the socket implementation suggested in FIG. 2 is but one possible embodiment, and that the present invention should not be considered as limited exclusively thereto. In FIG. 2, the ball swivel 120 rests within a U-shaped circular plate 124, which has flanges 128 to which the legs of the stand 100 are attached. Both the ball swivel 120 and the plate 124 are treated or coated with a finish or sealant that reduces friction and facilitates motion between the ball swivel 120 and the plate 124, including at a wide spectrum of temperature and humidity. The parts are machined, treated, and tempered to provide smooth, silent, non-stick, non-squeak operation.

Figure 2B:
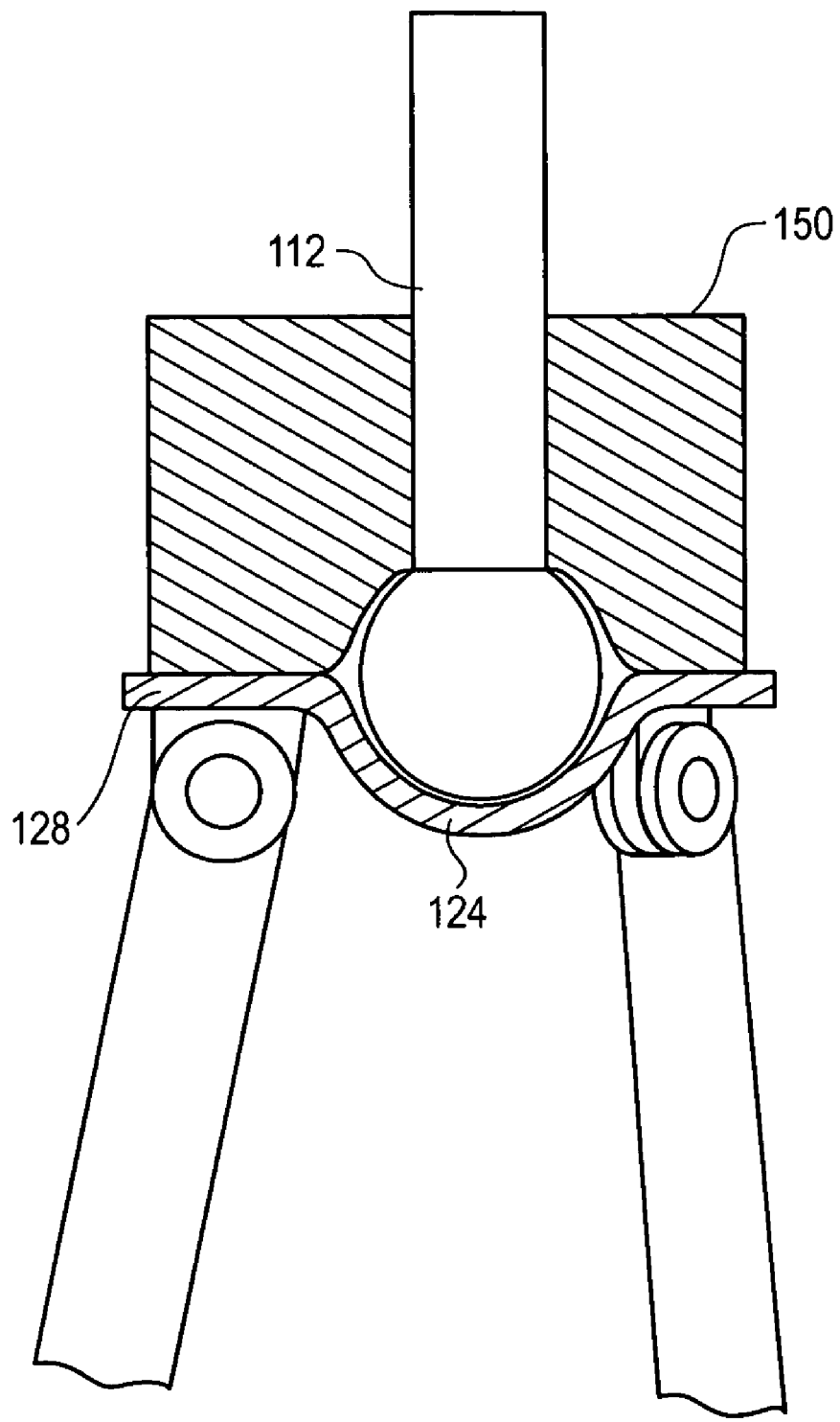
FIG. 2B is a more detailed view of ball swivel shown in FIG. 1.

The upper plate 130 secures the socket 112 to the plate 124. The upper plate 130 is coated with a finish or sealant that reduces friction, and also reduces noise. This is because the purpose of the upper plate 130 is to fixedly and resistably although not immovably secure the socket 112 to the plate 124. Accordingly, the lower surface of the plate 130 urges against the upper portion of the ball swivel 120 in such a way that movement of the swivel 120 is at least constrained if not altogether prohibited, especially when securing means 132 are fully tightened. Securing means 132 are shown in FIG. 2A as a bolt and wingnut combination, but a variety of other securing mechanisms could be used within the spirit and scope of the present invention, so that the present invention should not be considered as limited thereto. For example only, FIG. 2B shows a cut-away view of the embodiment which employs the gnurled securing means 150.

The socket 112, plates 124 and 130, and ball swivel 120 should be precision-machined or molded to careful tolerances and exact sizes, as well as be made of tempered steel or high durability plastic or other materials. This is because these parts must fit together precisely and consistently, and must bear significant weight, torque, and also work within the extreme temperature and humidity ranges that are part of a typical hunting process.

As stated, the stand 100 of the present invention also allows for making adjustments in height both by the winch 140 as well as the adjustable members 116, so as to be usable by a person of any size or stature, and can be used either while standing or while sitting down. To facilitate this adjustment, the legs of the tripod 104 contain rods for securing and extending the legs, but which assist in more securely retaining the collapsible legs of the present invention.

Additionally, the threaded securing mechanisms 116 can be fitted into a variety of heights, including not equidistant with each other, because it is possible that the stand 100 will be used in hilly or uneven terrain where one or two of the legs would need to be longer or shorter than the other. Accordingly, these securing mechanisms 116 must be quickly and reliably hand-adjustable without noise or tools, and can be gnurled. It is desired that all portions of the present invention assemble quickly without making complicated adjustments.

Figure 3A:
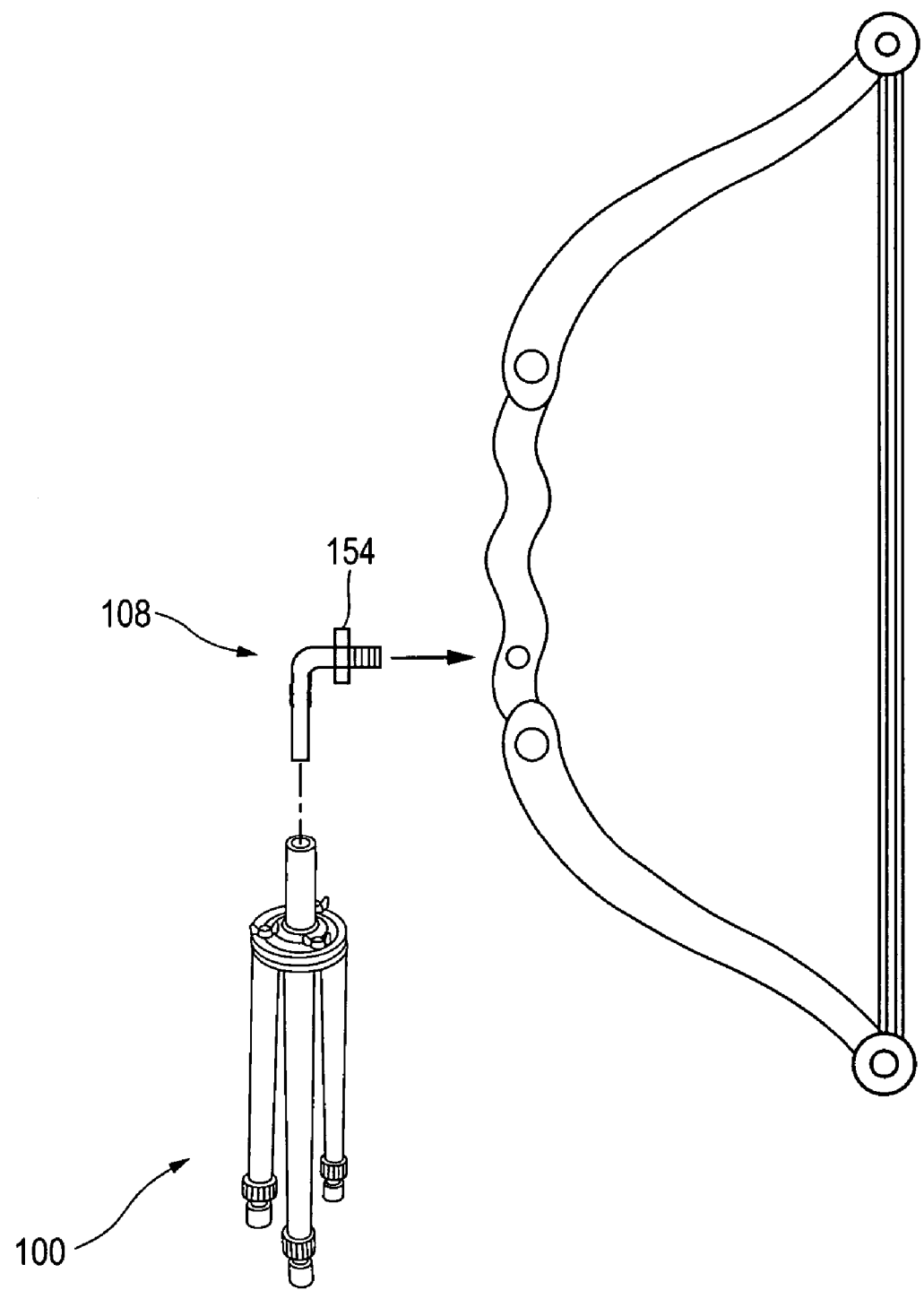
FIG. 3 shows a second embodiment of the present invention.

As shown in FIGS. 3A and 3B, the ball and socket joint 120 is connected in turn to the bow mount stem 108, which directly attaches to the bow in order to support the bow's weight. The bow mount stem 108 attaches to the bow at the threaded stabilizer port socket portion that comes with most bows. The ball and socket joint 120 allows the archer to quickly and quietly reposition the bow in order to aim.

A user will likely wish to sight prey while the bow is mounted within the present invention. For this reason, the ball swivel 120 must be slidably adjustable, including potential situations where the stand 100 is bearing the load of the bow. Additionally, the ball and socket mechanisms 112 are precision-machined and capable of being fixedly positioned so as to resist but not entirely prohibit movement.

Also as shown in FIGS. 3A and 3B, a reinforcing mechanism 154 exists to further secure the bow mount 108 to the bow to secure the bow mount 108 within the stabilizer port of the bow in the embodiment where the stabilizer port is threaded. The reinforcing mechanism can be a wingnut that travels the surface of the threads on the bow mount 108, although the present invention is limited exclusively thereto. The mechanism should be graspable and operable even in cold weather. Whatever the implementation, the purpose of the reinforcing mechanism is to threadably secure the bow mount 108 to the interior of the stabilizer port of the bow.

Figure 4A:
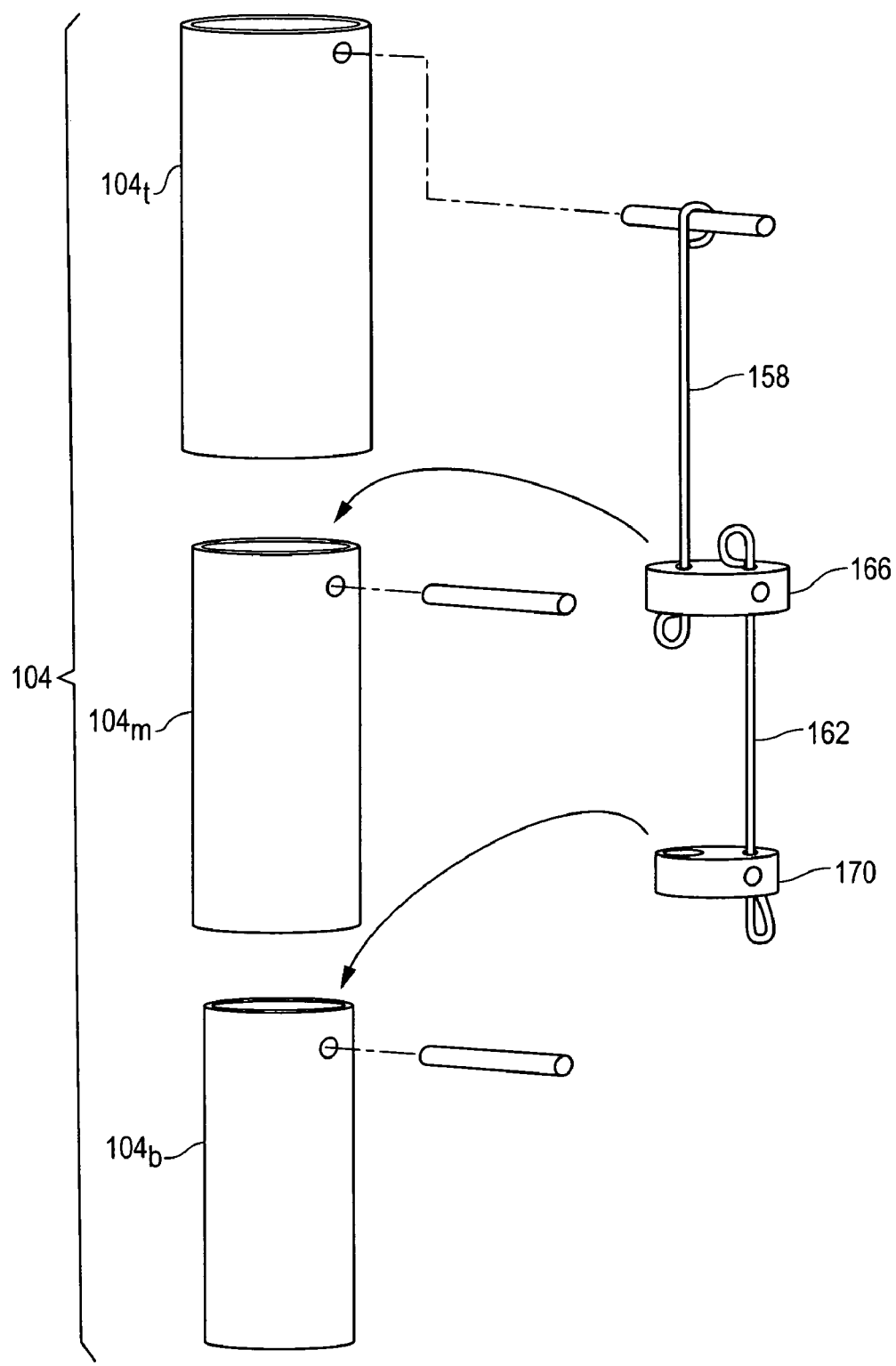

To facilitate the ease of operation and use of the adjustable legs, the interior of the legs is fitted with rods 158, 162 shown in FIGS. 4A-C. These rods 158, 162 enhance the internal weight-bearing strength of the legs 104, and also secure the telescoping members of the legs 104 to the tripod 100. For convenience, the fasteners 116 are not shown in FIGS. 4A-C.

FIG. 4A shows an exploded view a leg 104 divided into three parts, $104_t$ (top), $104_m$ (middle), and $104_b$ (bottom). FIG. 4B shows the rod of FIG. 4A in an assembled state, but fully-extended. FIG. 4C shows the rod of FIG. 4A again in an assembled state, but collapsed.

In FIG. 4A, the high portion of the upper rod 158 is secured to the section $104_t$ by a fastener 166, while the low portion of the upper rod 158 is movably secured to the section $104_m$ by the fastener 166. As the movable section 104m slides within the section $104_t$, the fastener 166 slidably travels along the rod 158. However, as shown in FIG. 4B, the fastener 166 provides a lower limit beyond which the rod 158 cannot travel, because of the loops formed therein.

Again referring to FIG. 4A, the high portion of the lower rod 162 is secured to the section $104_t$ by a fastener 166, while the low portion of the lower rod 162 is movably secured to the section $104_b$ by the fastener 170. As the movable section $104_b$ slides within the section $104_m$, the fastener 170 slidably travels along the rod 162. However, again as shown in FIG. 4B, the fastener 170 provides a lower limit beyond which the rod 158 cannot travel, because of the loops formed therein. The fastener 170 differs from the fastener 166 in that it is also built with an aperture or gap for passing the upper rod 158 when the leg 104 is in a fully-collapsed state as shown in FIG. 4C.

FIG. 4A also shows an expanded view of the fasteners 166 and 170, including top and side views. One possible arrangement for securing the fasteners 166, 170 within the sections $104_m$, $104_b$ could be to use pin rivets, although the present invention should not be considered as limited exclusively thereto.

The stand 100 of the present invention is advantageous because of its flexibility in making quick adjustments, in all temperatures. Because of the precision-machined or precision-molded composition, the tripod 104 will not seize up or refuse to lock into position at a critical time. Also, the present invention does not require the user to be in a standing position, and can be used as a teaching tool by children or other individuals who are first getting familiar with archery and bow usage.

The present invention can also include a reinforcing ring, which rests on top of the bow mount socket 112 and may at times bear the entire weight of the bow. Although not a required portion of the present invention, if the reinforcing ring is employed, it should be very solidly and securedly welded or formed within the bow mount 108 so as to not deform or break loose, as a considerable amount of stress will be focused therein.

The bow mount is installed as follows: the tripod 104 is set into the approximate desired location. The bow mount socket 112 is manually adjusted to an approximate location. The bow mount 108 is attached to the bow's stabilizer port. If the stabilizer port is threaded, then the bow mount 108 is manually spun until securely inside the port, or until sufficient snugness occurs. The reinforcing mechanism is then rotated into place to add a second level of reinforcement to secure the bow mount 108 to the bow. The bow mount 108 is then set in the bow mount socket 112. Even when the securing means 132 is completely tightened, some latitude still remains in order to allow the operator to manually sight to a target or prey.

Alternative embodiments of the present invention exist in which the tripod mechanism of the stand 100 is replaced by a bipod mechanism, as well as being replaced by a single support member. Within the bipod and single member embodiments, the ball swivel 120 as well as upper and lower plates 124, 130 could be implemented, but other less complex joining members could also be used.

The present invention greatly increases the range of accuracy for an archer. An archer that could shoot effectively at 30-35 yards will find that when using the present invention their effective range increases to perhaps 75 yards. An archer that could effectively shoot at 40 yards will find their effective range increases to perhaps 90 yards. At 75 yards, an arrow will achieve very near to the same penetration that it would at 30 yards. However, at 90 yards the penetration starts to decrease.

FIG. 1A also shows a reinforcing ring 111, which rests within the bow mount socket 112 and may at times bear the entire weight of the bow. Although not a required portion of the present invention, if the reinforcing ring 111 is employed, it should be very solidly and securely welded or formed within the bow mount 108 so as to not deform or break loose, as a considerable amount of stress will be focused therein.

It is anticipated that various changes may be made in the arrangement and operation of the system of the present invention without departing from the spirit and scope of the invention, as defined by the following claims.

What is claimed is:

1. A stand for an archery bow, comprising:
a base, having a ball and socket joint movably and detachably affixed thereto; a bow mount attached to said ball and socket joint; means for securing said bow mount to the archery bow; and a reinforcing ring on the bow mount, which rests on top of said socket and may at times bear the entire weight of the bow.

2. The stand of claim 1, wherein said base is a tripod.

3. The stand of claim 1, further comprising:
said bow mount rests in said socket joint in such a way that the bow mount can be fixedly secured therein.

4. The stand of claim 3, further comprising:
said socket joint is threaded.

5. The stand of claim 1, further comprising:
said stand has legs for elevating said ball and socket joint off the ground;
wherein said legs are height-adjustable using threaded securing mechanisms.

6. The stand of claim 5, further comprising:
the interior of said legs is fitted with movable rods as retainers.

7. The stand of claim 1, further comprising:
said stand is used in hilly or uneven terrain.

8. The stand of claim 1, wherein said means for securing said bow mount on top of said socket comprise threaded screws.

9. The stand of claim 1, wherein said means for securing said bow mount on top of said socket comprise a clamping mechanism which can be manually adjusted, either using threaded or knurled surfaces.

10. The stand of claim 1, further comprising:
said bow mount is removable from said socket for disassembly and transportation purposes.

11. The stand of claim 1, further comprising:
a knurled securing mechanism attached to said ball and socket, for securing said ball and socket to said base.

12. The stand of claim 1, further comprising:
a winch, connected to said base, for adjusting the elevation of said ball and socket.

13. The stand of claim 1, further comprising:
an upper plate for securing said socket to said base.

14. The stand of claim 13, further comprising:
said upper plate is coated with a finish or sealant that reduces friction and noise during movement of said ball.

15. The stand of claim 14, further comprising:
said socket, plate, and ball are precision-machined or molded to careful tolerances and exact sizes.

16. The stand of claim 15, further comprising:
said socket, plate, and ball are made of tempered steel or high durability plastic.

17. The stand of claim 1, further comprising:
fasteners or providing a limit for said movable rods.

18. The stand of claim 17, further comprising:
said fasteners being held to said legs by pin rivets.

* * * * *